(12) United States Patent
Taira

(10) Patent No.: US 8,161,950 B2
(45) Date of Patent: Apr. 24, 2012

(54) EXHAUST GAS RECIRCULATING DEVICE FOR INTERNAL COMBUSTION ENGINES

(75) Inventor: Takahiro Taira, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 12/634,923

(22) Filed: Dec. 10, 2009

(65) Prior Publication Data

US 2010/0154759 A1    Jun. 24, 2010

(30) Foreign Application Priority Data

Dec. 23, 2008  (JP) ................................. 2008-326714

(51) Int. Cl.
F02M 25/07 (2006.01)

(52) U.S. Cl. ................................. 123/568.17

(58) Field of Classification Search ............. 123/568.11, 123/568.17, 4.21, 184.38, 184.42, 184.21, 123/148.43

See application file for complete search history.

(56) References Cited

U.S. PATENT DOCUMENTS

| | | | | |
|---|---|---|---|---|
| 4,693,226 A | * | 9/1987 | Choma .................... | 123/568.17 |
| 4,867,109 A | * | 9/1989 | Tezuka et al. ............ | 123/568.17 |
| 5,427,080 A | * | 6/1995 | Maeda et al. ............ | 123/568.17 |
| 5,666,930 A | * | 9/1997 | Elder ...................... | 123/568.17 |
| 5,970,960 A | * | 10/1999 | Azuma .................... | 123/568.17 |
| 6,895,948 B2 | * | 5/2005 | Mori et al. ............... | 123/568.17 |
| 7,032,579 B2 | * | 4/2006 | Nishida et al. .......... | 123/568.17 |
| 2005/0039730 A1 | * | 2/2005 | Nishida et al. .......... | 123/568.17 |
| 2005/0235972 A1 | | 10/2005 | Yi | |

FOREIGN PATENT DOCUMENTS

| | | |
|---|---|---|
| FR | 2655382 A1 | 6/1991 |
| JP | 61-63466 U | 4/1986 |
| JP | 5180091 A | 7/1993 |
| JP | 2002-371920 A | 12/2002 |
| JP | 2004183484 A | 7/2004 |
| JP | 2007-186998 A | 7/2007 |
| JP | 2008-075522 | 4/2008 |

OTHER PUBLICATIONS

Japanese Office Action application No. 2008-326714 dated May 16, 2011.
Chinese Office Action application No. 200910251206.0 dated Jun. 17, 2011.

* cited by examiner

Primary Examiner — Stephen K Cronin
Assistant Examiner — Arnold Castro
(74) Attorney, Agent, or Firm — Squire Sanders (US) LLP

(57) ABSTRACT

In an exhaust gas recirculating device for an internal combustion engine, an EGR gas introduction port (32) for feeding EGR gas to an intake passage (20) includes an inlet end and an outlet end, and has a cross sectional area progressively increasing from the inlet end to the outlet end, the outlet end (49) opening out at an upper part of the intake passage. Because the EGR gas introduction port has a cross sectional area progressively increasing from the inlet end to the outlet end thereof, and the outlet end of the EGR gas introduction port opens out at an upper part of the intake passage, even when an intake flow is blown back from the engine main body, carbon and oil that may be contained in the EGR gas can be prevented from being deposited in the EGR gas introduction port, and this prevents the clogging of the EGR gas introduction port.

11 Claims, 11 Drawing Sheets

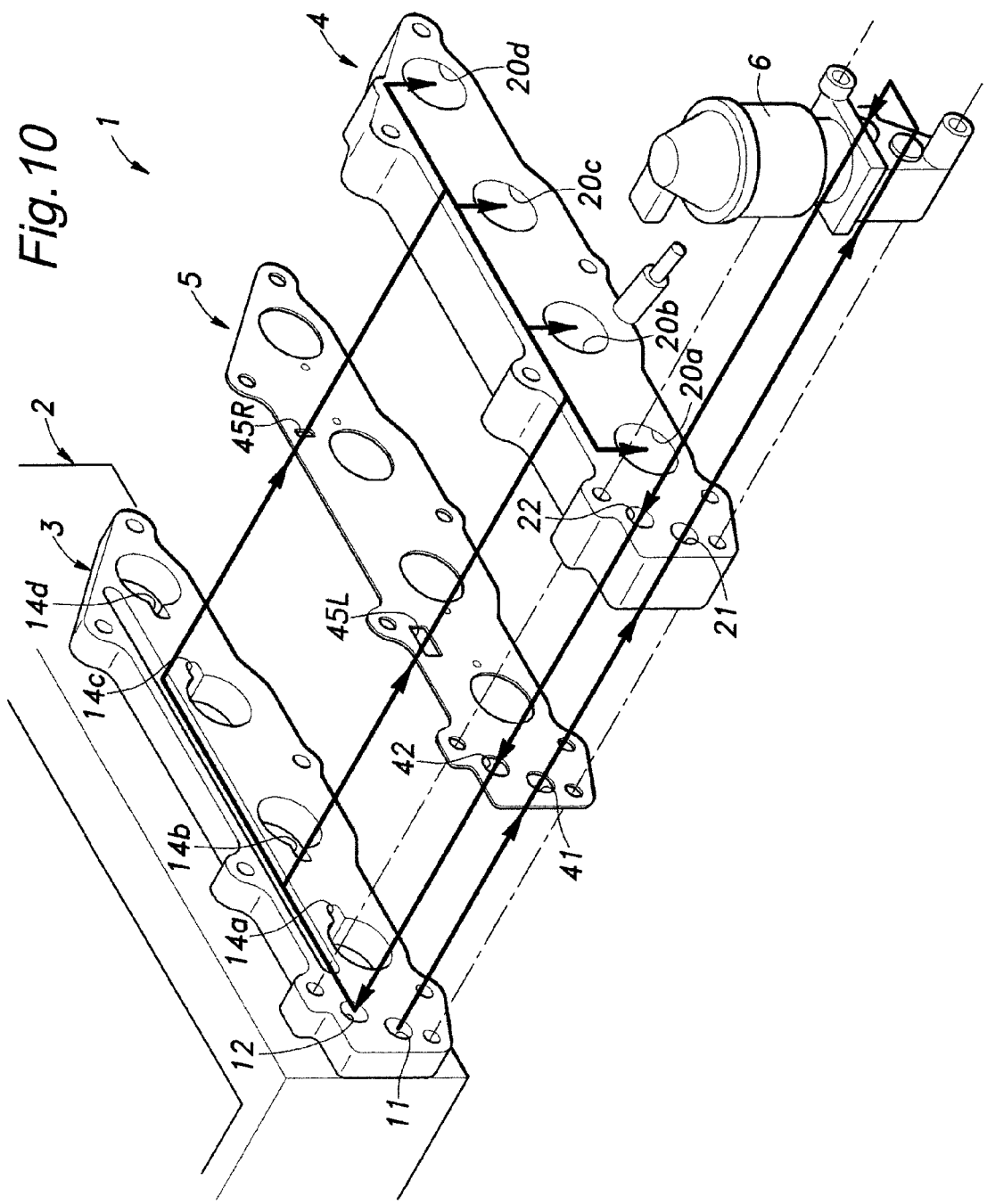

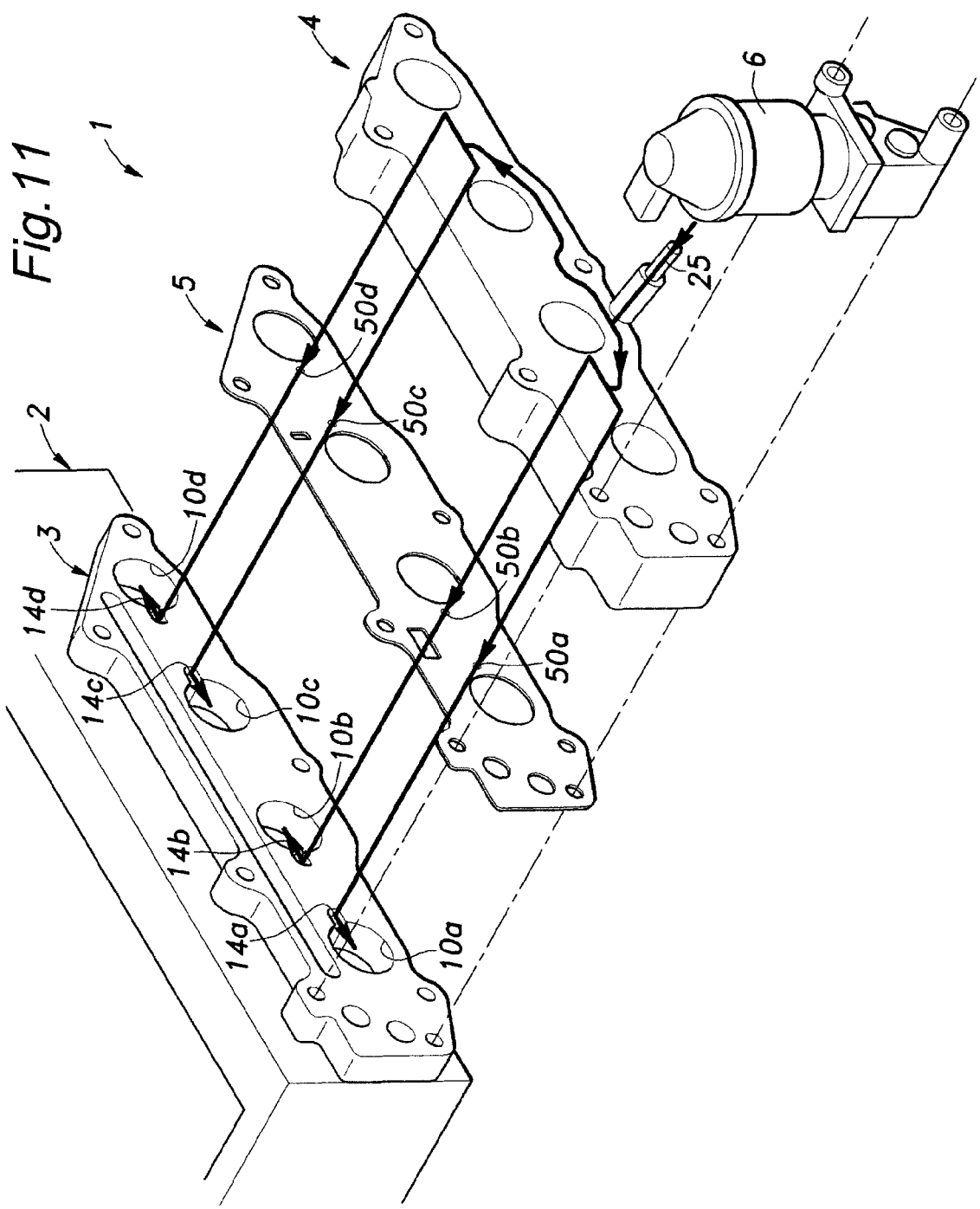

EXHAUST GAS RECIRCULATING DEVICE FOR INTERNAL COMBUSTION ENGINES

TECHNICAL FIELD

The present invention relates to a device for recirculating a part of exhaust gas of an internal combustion engine to an intake system thereof.

BACKGROUND OF THE INVENTION

Current internal combustion engines such as automotive internal combustion engines typically comprise an exhaust gas recirculating device (which is referred to as EGR device hereinafter) that recirculates a part of exhaust gas (which is referred to as exhaust gas recirculating gas or EGR gas hereinafter) to the intake system thereof for the purposes of improving fuel economy and reducing the NOx contents in the exhaust gas.

For such EGR devices, proposals have been made to prevent the clogging of an introduction port for introducing EGR gas into an intake passage. According to a proposal disclosed in Patent Document 1 (Japanese patent laid open publication No. 2008-75522), a distribution passage for EGR gas and blow-by gas is formed in a plate member provided between an intake manifold and a cylinder head in such a manner that a distribution passage outlet for blow-by gas (blow-by gas introduction port) is located downstream of a distribution passage outlet for EGR gas (EGR gas introduction port) with respect to the intake flow. Thereby, the structure around the intake passage of the engine can be simplified while the clogging of the distribution passage outlet for EGR gas with carbonized oil contents or the like that may be mixed in the blow-by gas can be avoided.

In a four-stroke engine, when an intake valve and an exhaust valve are simultaneously opened in an early part of an intake stroke (valve overlap), or when an intake valve is not fully closed in an early part of a compression stroke, a backflow of intake flow from the cylinder head to the intake manifold can occur. However, according to the proposal disclosed in Patent Document 1, because the distribution passage outlet for EGR gas is provided adjacent to the main part of the intake flow, when such a backflow occurs, carbon particles and oil contained in the blow-by gas may be deposited on an area surrounding the distribution passage outlet for EGR gas, and this could cause a clogging of the distribution passage outlet for EGR gas.

BRIEF SUMMARY OF THE INVENTION

In view of such problems of the prior art, a primary object of the present invention is to provide an exhaust gas recirculating device for internal combustion engines that can avoid the clogging of an EGR gas introduction port due to deposition of carbon and oil even when a backflow of intake from the main part of the engine occurs.

A second object of the present invention is to provide an exhaust gas recirculating device for internal combustion engines that allows the passages for EGR gas and blow-by gas to be formed in a convenient and economical manner.

According to the present invention, such an object can be accomplished by providing an exhaust gas recirculating device for an internal combustion engine, comprising: an EGR passage member interposed between a main body of an internal combustion engine and an intake pipe, and defining an intake passage for conducting an engine intake from the intake pipe to an intake port of a cylinder head of the engine, an EGR passage for conducting exhaust gas of the engine into the intake passage and an EGR gas introduction port for introducing the exhaust gas from the EGR passage into the intake passage; wherein the EGR gas introduction port includes an inlet end and an outlet end, and has a cross sectional area progressively increasing from the inlet end to the outlet end, the outlet end opening out at an upper part of the intake passage.

Because the EGR gas introduction port has a cross sectional area progressively increasing from the inlet end to the outlet end thereof, and the outlet end of the EGR gas introduction port opens out at an upper part of the intake passage, even when an intake flow is blown back from the engine main body, carbon and oil that may be contained in the EGR gas can be prevented from being deposited in the EGR gas introduction port, and this prevents the clogging of the EGR gas introduction port.

The EGR gas introduction port may comprise a small diameter section formed in an inlet part thereof and a large diameter section formed in an outlet part thereof. Alternatively, the EGR gas introduction port may comprise a tapered configuration having a progressively increasing diameter from an inlet end to an outlet end thereof.

The EGR gas introduction port may be provided adjacent to an interface between the EGR passage member and the intake pipe. When the EGR gas introduction port is placed in a part remote from the engine main body in this manner, the back flow of the engine intake is less likely to reach the EGR gas introduction port, and this contributes to the prevention of the clogging of the EGR gas introduction port.

According to a preferred embodiment of the present invention, the EGR gas introduction port has an axial line that passes across a part of an inner passage of the intake pipe. This allows the EGR gas introduction port to be easily formed by drilling or the like.

According to a certain aspect of the present invention, the passage member is additionally formed with a blow-by gas passage for conducting blow-by gas of the engine to an intake port of the engine, and an inlet of the blow-by gas passage is provided on a side of the passage member remote from the engine while an outlet of the blow-by passage is provided in a part of the intake passage adjacent to the engine. Thereby, the passage for blow-by gas can be formed without requiring any additional components.

Typically, the engine comprises a plurality of cylinders arranged in a row, and the EGR passage member comprises a plurality of intake passages corresponding to the different cylinders of the engine and an EGR chamber interposed between the EGR passage and the inlet ends of the EGR gas introduction ports. In such a case, the exhaust gas recirculating device of the present invention may comprise an EGR control valve attached to an outer end of the passage member remote from the engine and having an inlet port and an outlet port, and the EGR passage may include a first part extending across the passage member from the engine to the inlet port of the EGR control valve and a second part extending from the outlet port of the EGR control valve to the EGR gas introduction port via an EGR chamber formed in the passage member.

The EGR chamber enables the exhaust gas to be distributed evenly to the different intake passages, and this also contributes to the prevention of the clogging of the EGR gas introduction ports.

According to a particularly preferred embodiment of the present invention, the passage member comprises a first member adjacent to the engine, a second member remote from the engine and a gasket interposed between the first member and second member, the first member is provided with a groove extending in a direction of the cylinder row on a side of the first member remote from the engine and defining an elongated chamber in cooperation with the gasket, one end of the elongated chamber being communicated with the second part of the EGR passage, and the second member is formed with the EGR chamber, an opening being formed in the gasket for communicating the elongated chamber with the EGR chamber. The first member may be integrally formed with a cylinder head of the engine or formed as a separate member.

If the gasket is formed with two openings communicating the elongated chamber with the EGR chamber, and one of the openings adjacent to the one end of the elongated chamber communicating with an upstream part of the second part of the EGR passage is smaller than the other opening, the EGR gas can be distributed evenly to the different cylinders of the engine.

In a particularly preferred embodiment of the present invention, the passage member is additionally formed with a bifurcated blow-by gas passage for conducting blow-by gas of the engine, and an inlet of the blow-by gas passage is provided on a side of the passage member remote from the engine while each of bifurcated outlets of the blow-by gas passage is provided in a part of the corresponding intake passage adjacent to the engine.

BRIEF DESCRIPTION OF THE DRAWINGS

Now the present invention is described in the following with reference to the appended drawings, in which:

FIG. 10 is an exploded perspective view of the EGR device illustrating the flow of EGR gas; and FIG. 11 is an exploded perspective view of the EGR device illustrating the flow of blow-by gas.

DETAILED DESCRIPTION OF THE PREFERRED EMBODIMENTS

In the following description, for the convenience of description, orientations of various parts are indicated by the notation defined in FIG. 1 although the actual orientation of the various parts may vary depending on the actual orientation of the engine. Also, the engine of the illustrated embodiment consists of a four-cylinder engine, and corresponding components of different cylinder are denoted by adding a suffix a-b. For instance, an intake port is generally denoted with numeral 10, and an intake port of any particular cylinder is denoted with numeral 10a-10d. However, the present invention is not limited by this particular example, but may be applicable to engines of different types, such as single cylinder engines, in-line multiple cylinder engines and V-type multiple cylinder engines.

Figure 1:
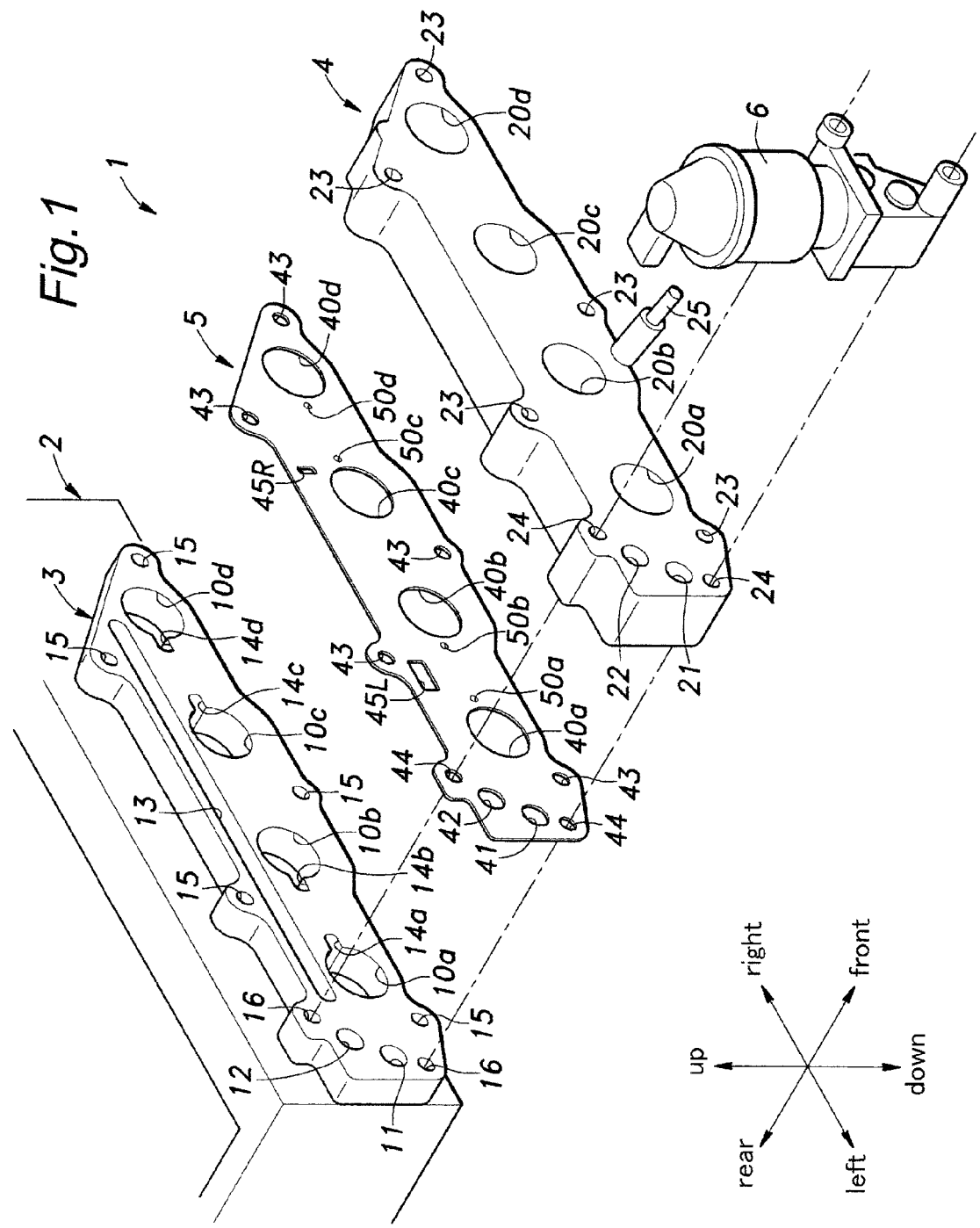
FIG. 1 is an exploded perspective view of an EGR device embodying the present invention.
Figure 2:
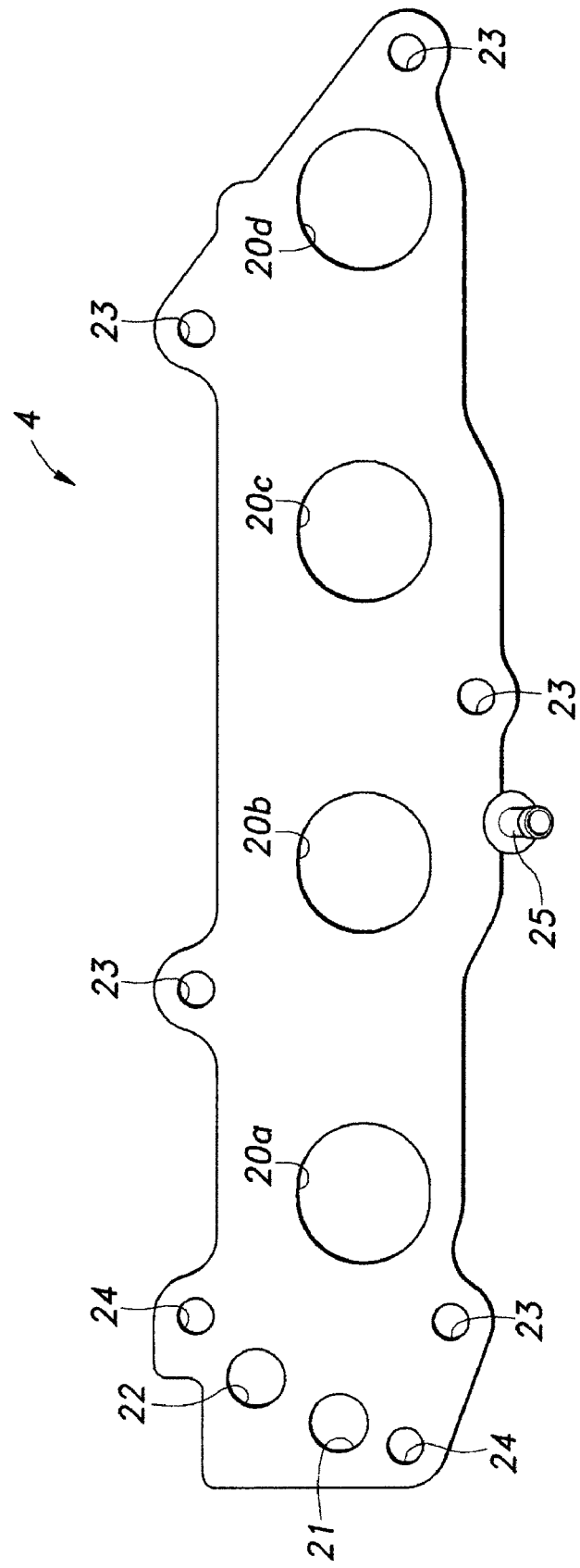
FIG. 2 is a front view of an EGR plate used in the EGR device.
Figure 3:
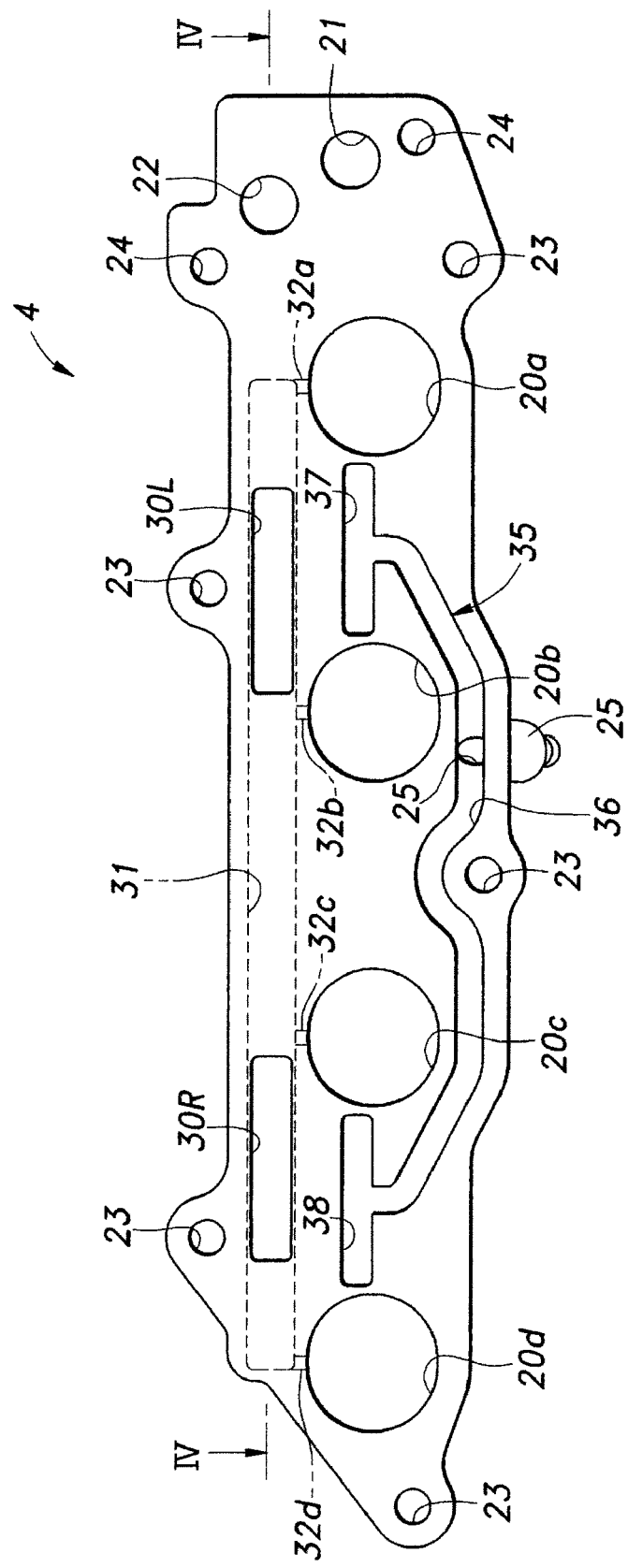
FIG. 3 is a rear view of the EGR plate.
Figure 4:
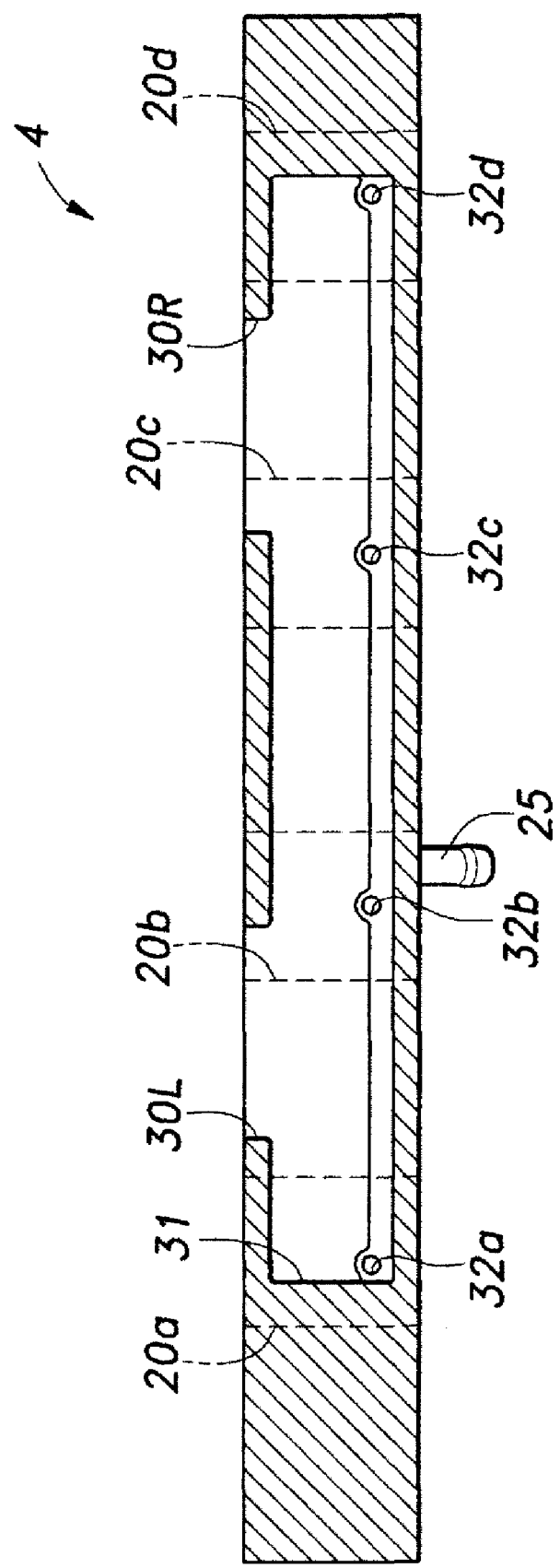
FIG. 4 is a sectional view taken along line IV-IV of FIG. 3.
Figure 5:
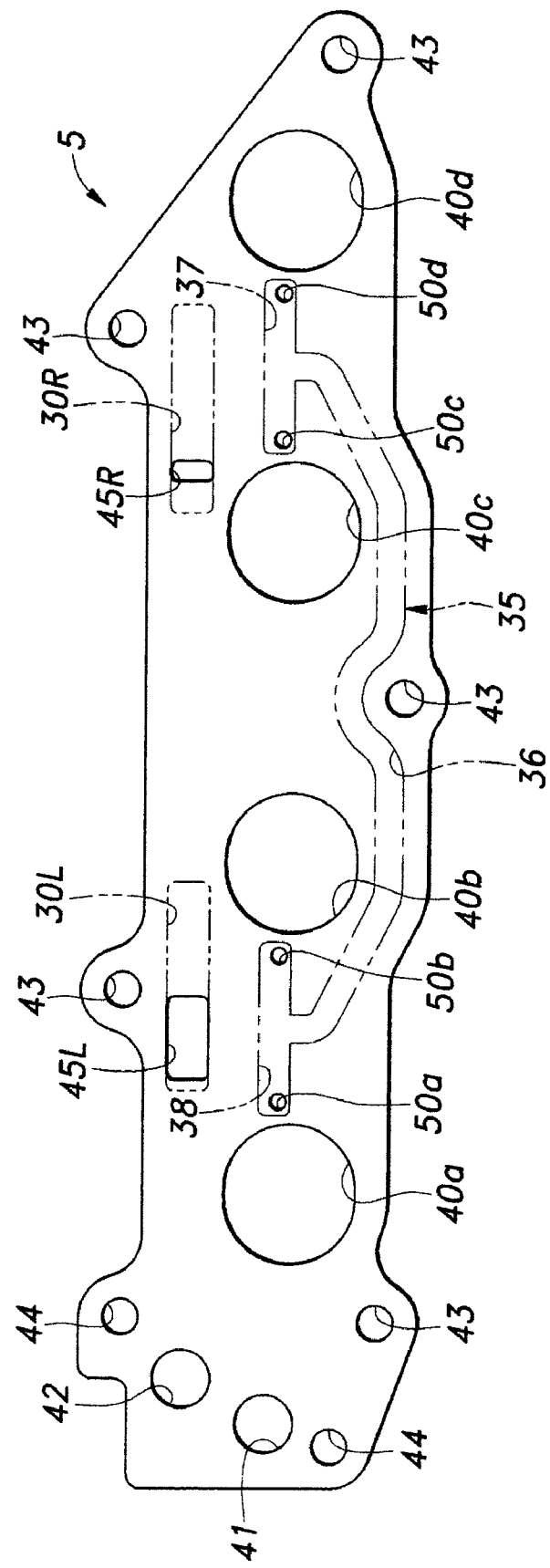
FIG. 5 is a front view of a gasket used in the EGR device.
Figure 6:
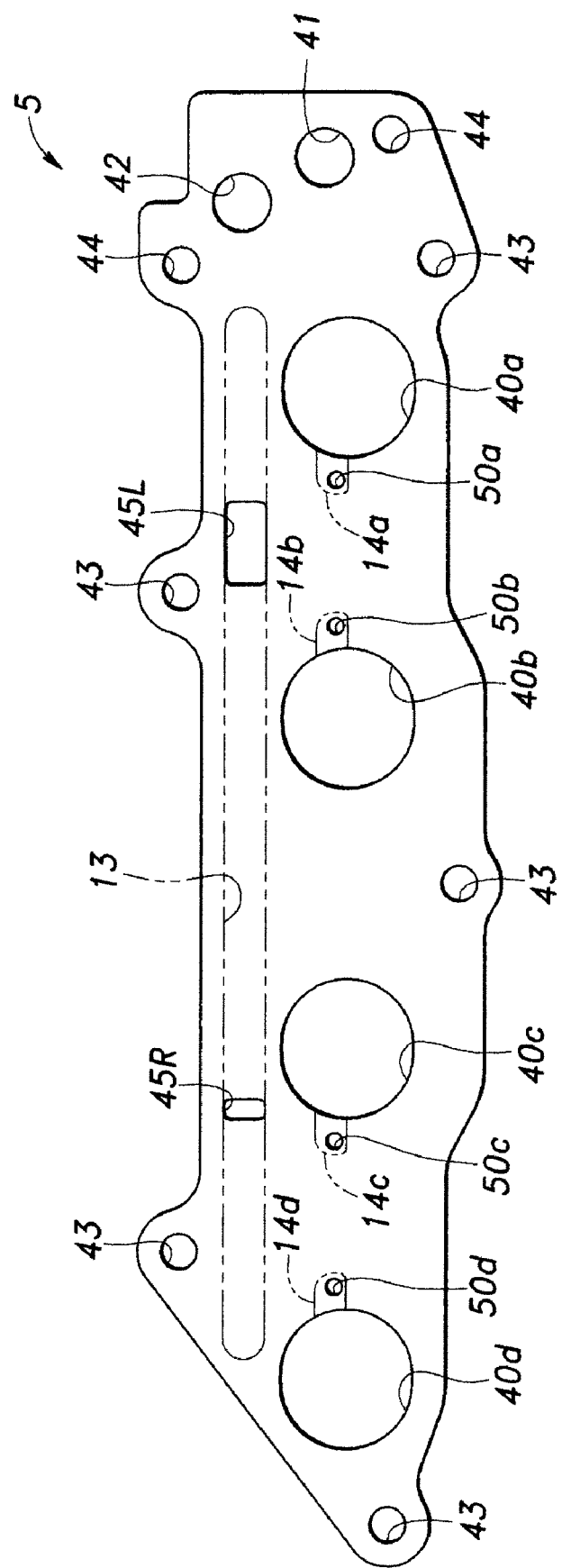
FIG. 6 is a rear view of the gasket.

FIG. 1 is an overall exploded perspective view of an EGR device embodying the present invention, and FIGS. 2-4 show an EGR plate 4 of the EGR device. FIGS. 5 and 6 show a gasket 5 of the EGR device.

Figure 7:
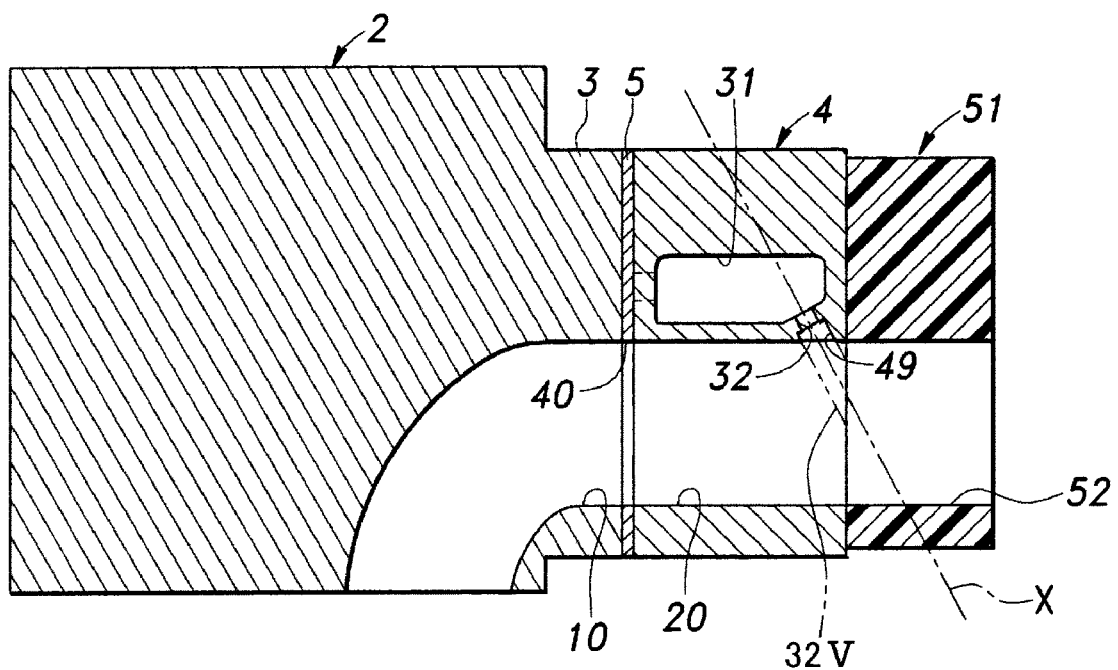
FIG. 7 is a fragmentary sectional view of the EGR device.

Referring to FIG. 1, an automotive in-line four-cylinder engine is provided with an EGR device 1 for recirculating a part of the exhaust gas of the engine to the intake system of the engine. The EGR device 1 comprises an intake connecting member 3 attached to a side part of a cylinder head 2 of the engine defining intake ports and an EGR plate 4 attached to the outer side of the intake connecting member 3 via a gasket 5. The intake connecting member 3 may be integrally cast with the cylinder head 2 as in the illustrated embodiment, but may also be a separate member that is attached to the cylinder head by using suitable means such as threaded bolts and welding. To the outer side of the EGR plate 4 is attached an intake manifold 51 (FIG. 7). The EGR device 1 further comprises an EGR control valve 6 attached to the EGR plate 4 for controlling the flow of the EGR gas according to the operating condition of the engine in a per se known manner.

The intake connecting member 3 of the cylinder head 2 is provided with four intake ports 10a-10d arranged laterally in a row (or along the cylinder row) in a mutually spaced apart relationship so as to correspond to the four cylinders of the engine. The intake connecting member 3 is additionally formed with an EGR gas outlet hole 11 for ejecting EGR gas from the cylinder head 2 to the EGR control valve 6, an EGR gas inlet hole 12 for receiving EGR gas metered by the EGR control valve 6 and an EGR gas inlet groove 13 extending linearly above the intake ports 10 in the lateral direction of the engine (along the cylinder row of the engine). Each intake port 10 has a substantially circular opening, and is provided with a blow-by gas introduction groove 14 on a lateral side of the intake port 10 to introduce blow-by gas into the engine intake. A peripheral part of the intake connecting member 3 is provided with a plurality of threaded mounting holes 15 for attaching the EGR plate 4 and gasket 5 onto the intake connecting member 3. Some of the threaded mounting holes 16 are used for the additional purpose of attaching the EGR control valve 6 to the EGR plate 4.

The EGR plate 4 is a metallic plate member which may be formed by casting for instance, and is formed with intake passages 20a-20d corresponding to the intake ports 10a-10d of the intake connecting member 3, respectively, for passing the engine intake from the intake manifold 51 to the cylinder head 2. The peripheral part of the EGR plate 4 is formed with through holes 21 and 22 corresponding to the EGR gas outlet hole 11 and EGR gas inlet hole 12 of the intake connecting member 3 and through holes 23 and 24 corresponding to the threaded mounting holes 15 and 16 of the intake connecting member 3. A blow-by gas inlet pipe 25 extends from a lower middle part of the front face of the EGR plate 4 for connecting a hose or pipe (not shown in the drawings) for supplying blow-by gas thereto.

As shown in FIG. 3, a pair of EGR slots 30L and 30R each having a rectangular shape are formed in the rear surface of the EGR plate 4 at positions corresponding to the EGR gas inlet groove 13 of the intake connecting member 3. The EGR slots 30L and 30R form inlets of an EGR chamber 31 formed in the EGR plate 4 as best shown in FIG. 4. The EGR chamber 31 has the shape of an elongated rectangular solid, and extends in the direction of the cylinder row above the intake passages 20a to 20d. The EGR chamber 31 communicates with four EGR gas introduction ports 32a to 32d at a lower front part thereof.

As shown in FIG. 3, the rear surface of the EGR plate 31 is additionally formed with a blow-by gas distribution groove 35 communicating with the blow-by gas inlet pipe 25. The blow-by gas distribution groove 35 defines a bifurcated passage in cooperation with the gasket 5, and comprises an upstream section 36 extending laterally under the two middle intake passages 20b and 20c and a pair of downstream sections 37 and 38 communicating with the upstream section 36 and extending laterally between the intake passages 20a and 20b and between the intake passages 20c and 20d, respectively. The downstream sections 37 and 38 are aligned with a central line of the intake passages 20a to 20d. As seen in a front view, the lateral ends of the downstream section 37 coincide with the blow-by gas introduction grooves 14a and 14b of the intake connecting member 3, and the lateral ends of the downstream section 38 coincides with the blow-by gas introduction grooves 14c and 14d of the intake connecting member 3, via openings formed in the gasket 5 as will be described hereinafter.

The gasket 5 is a thin plate member made of metallic material, and is interposed between the intake connecting member 3 and EGR plate 4 as shown in FIG. 1. Referring to FIGS. 5 and 6, the gasket 5 is formed with intake openings 40a to 40d at positions corresponding to the intake ports 10a to 10d of the intake connecting member 3 and the intake passages 20a to 20d of the EGR plate 4. The peripheral part of the gasket 5 is formed with EGR gas openings 41 and 42 corresponding to the EGR gas outlet hole 11 and EGR gas inlet hole 12, respectively, and mounting openings 43 and 44 corresponding to the threaded mounting holes 15 and 16 of the intake connecting member 3, respectively. The gasket 5 is further formed with EGR gas distribution openings 45L and 45R for distributing EGR gas at positions corresponding to the EGR slots 30L and 30R (indicated by double-dot chain-dot lines in FIG. 5) of the EGR plate 4 and the EGR gas introduction groove 13 (indicated by double-dot chain-dot lines in FIG. 6) the intake connecting member 3. The opening area of the EGR gas distribution opening 45L adjacent to the communication passage (not shown in the drawing between the EGR gas inlet hole 12 and EGR gas introduction groove 13 is greater than the EGR gas distribution opening 45R remote from the communication passage so that an adequate amount of EGR gas is introduced into the EGR chamber 31, and the EGR gas is evenly distributed between the different cylinders.

As shown in FIG. 6, the gasket 5 is formed with blow-by gas introduction openings 50a to 50d at positions corresponding to the blow-by gas introduction grooves 14a to 14d (indicated by double-dot chain-dot lines in FIG. 6) of the intake connecting member 3. The opening area of each blow-by gas introduction openings 50 is smaller than the corresponding blow-by gas introduction groove 14 so that the amount of blow-by gas introduced into the intake ports 10 can be appropriately adjusted. The positions of the blow-by gas introduction openings 50a and 50b correspond to the two terminal ends of the downstream section 37, and the positions of the blow-by gas introduction openings 50c and 50d correspond to the two terminal ends of the downstream section 38.

Figure 8:
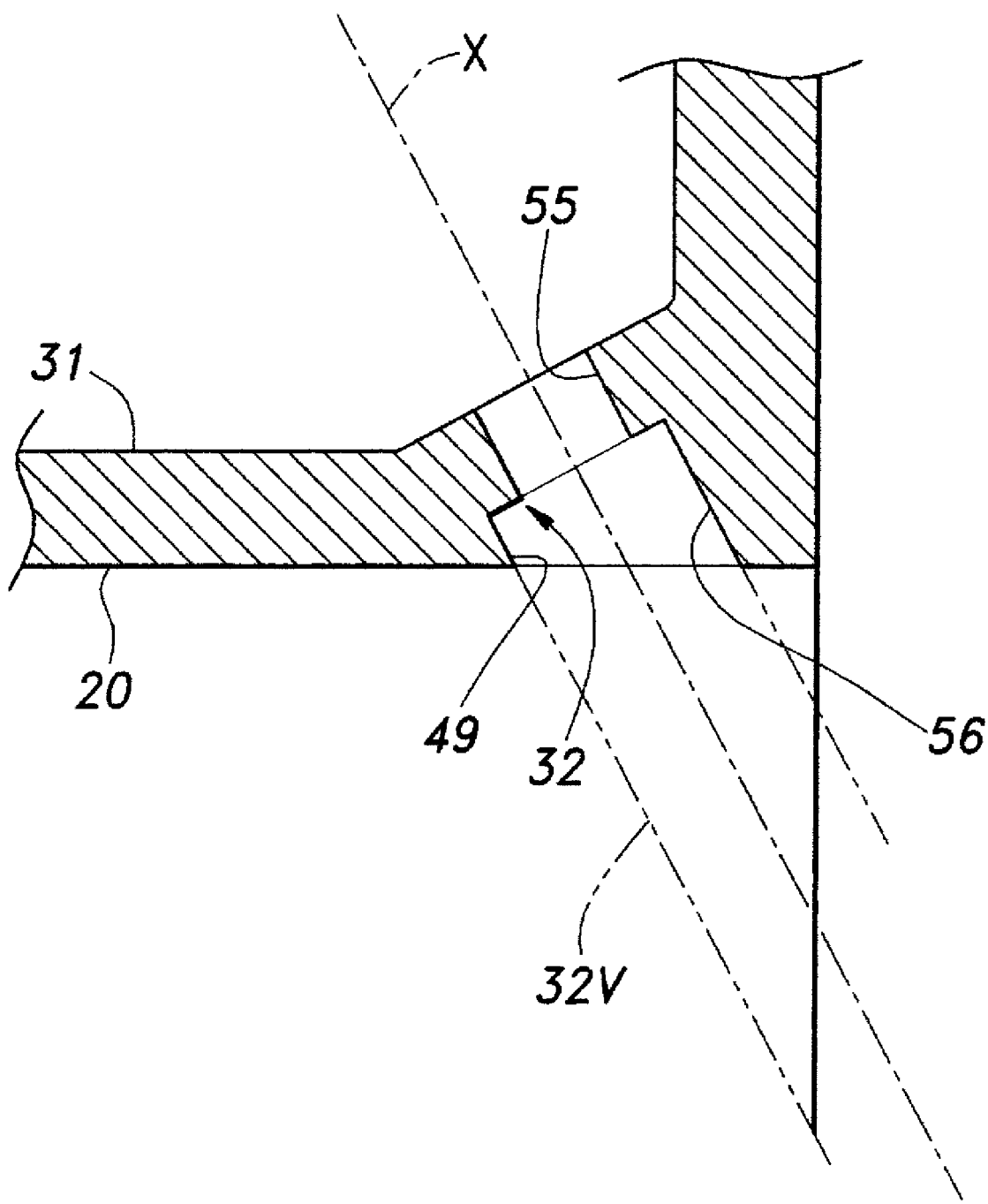
FIG. 8 is an enlarged fragmentary sectional view of an EGR gas introduction port of the EGR device.

FIG. 7 is a simplified sectional view of the EGR device shown in FIG. 7, and FIG. 8 is an enlarged sectional view of the EGR gas introduction port shown in FIG. 7.

As shown in FIG. 7, the EGR gas introduction port 32 extends from a lower part of the EGR chamber 31 adjacent to the intake manifold 51, and opens out at an upper part of the intake passage 20 as denoted with numeral 49. The intake manifold 51 comprises an intake pipe 52 defining an internal passage connected to the intake passage 20. The EGR gas introduction port 32 has an axial line X directed toward the intake manifold 51 (or toward the upstream of the intake passage 20), and extends across a part of the internal passage of the intake pipe 52. As shown in FIG. 8, the EGR gas introduction port 32 has a small diameter section 55 in an inlet end thereof and a large diameter section 56 in a outlet end thereof so that the cross sectional area of the EGR gas introduction port 32 progressively increases from the inlet end thereof to the outlet end thereof.

Figure 9:
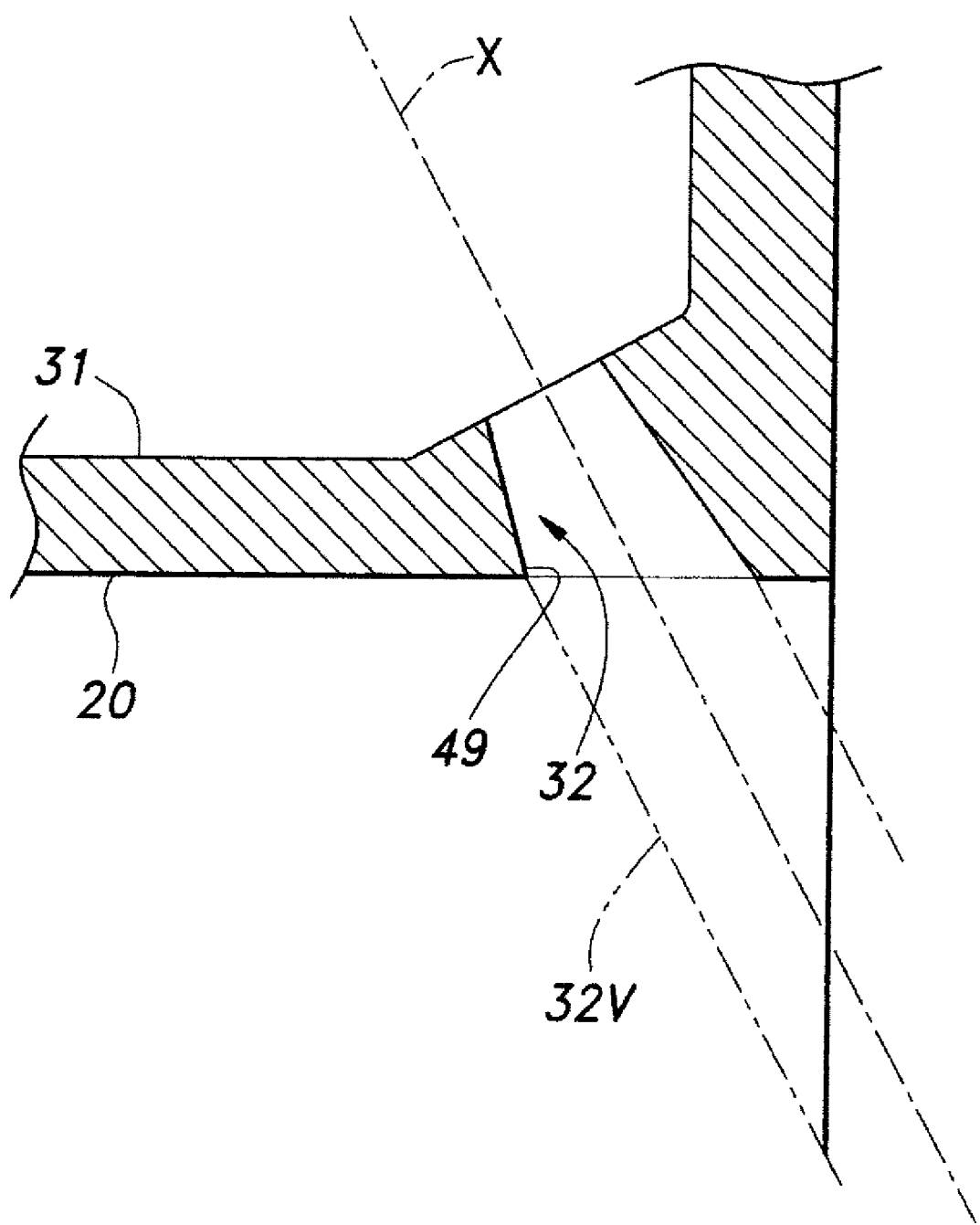
FIG. 9 is a view similar to FIG. 8 showing an alternate embodiment of the EGR gas introduction port.

FIG. 9 shows an alternate embodiment of the EGR gas introduction port 32 which is given a tapered shape whose cross sectional area progressively increases from the inlet end thereof to the outlet end thereof In FIG. 9, the parts corresponding to those of the previous embodiment are denoted with like numerals without repeating the description of such parts FIGS. 10 and 11 are views similar to FIG. 1 showing the flows of EGR gas and blow-by gas, respectively, by arrows.

Referring to FIG. 10, the EGR gas released from the cylinder head 2 and expelled from the EGR outlet hole 11 of the intake connecting member 3 is introduced into the EGR control valve 6. The EGR control valve 6 adjusts the flow of the EGR gas from the EGR outlet hole 11 according to the operating condition of the engine, and forwards an adjusted amount of the EGR gas to the EGR inlet hole 12. Thereafter, the EGR gas flows into the EGR gas introduction groove 13, and passes through the EGR gas distribution openings 45L and 45R of the gasket 5, and the EGR slots 30L and 30R (See FIG. 3) of the EGR plate 4, before flowing into the EGR chamber 31. The EGR gas in the EGR chamber 31 is fed into the intake passages 20 via the corresponding EGR gas introduction ports 32 (See FIG. 5).

Because each EGR gas introduction port 32 opens out at an upper part of the corresponding intake passage 20, even when a backflow of the intake from the cylinder head 2 should occur, heavier contents of the blow-by gas such as oil and carbon are allowed to flow in a lower part of the intake passage 20, and is prevented from being deposited in a part adjacent to the EGR gas introduction port 32. Because the axial line X of each EGR gas introduction port 32 is directed toward the intake manifold 51, even when a backflow of the intake from the cylinder head 2 should occur, foreign matters such as carbon in the EGR gas and oil in the blow-by gas are prevented from flowing into the EGR gas introduction port 32.

Because the cross sectional area of each EGR gas introduction port 32 progressively increases toward the outlet end thereof, even when foreign matters such as carbon and oil should be deposited in a part adjacent to the outlet end of the EGR gas introduction port 32, an adequate opening area can be ensured for the EGR gas introduction port 32, and the clogging of the EGR gas introduction port 32 can be effectively prevented. Also, the provision of a small diameter portion 55 in the inlet end of the EGR gas introduction port 32 (instead of reducing the diameter of the EGR gas introduction port 32 over the entire length thereof) allows the flow rate of the EGR gas to be appropriately adjusted.

Because the EGR chamber 31 having a relatively large volume is provided upstream of the EGR gas introduction ports 32, the EGR gas can be evenly distributed to the different cylinders of the engine, and the clogging of the EGR gas introduction ports 32 can be effectively prevented.

When each EGR gas introduction port 32 opens out at a part of the intake passage 20 adjacent to the intake manifold 51, and is therefore provided remote from the cylinder head 2 of the engine, the clogging of the EGR gas introduction port 32 can be effectively prevented because the engine backflow is prevented from reaching the EGR gas introduction port 32.

When the axial line X of each EGR gas introduction port 32 passes across a part of the inner passage of the intake pipe 52 of the intake manifold 51, the process of forming the EGR gas introduction port 32 can be simplified, and the manufacturing cost can be reduced. For instance, the EGR plate 4 is formed by casting, and the EGR gas introduction port 32 is formed by drilling.

Referring to FIG. 11, the blow-by gas received from the blow-by gas introduction pipe 25 flows into the upstream section 36 of the blow-by gas distribution groove 35 (See FIG. 3) of the EGR plate 4, and flows from the downstream sections 37 and 38 of the blow-by gas distribution groove 35 into the corresponding intake passages 20 via the corresponding blow-by gas introduction openings 50 and corresponding blow-by gas introduction grooves 14.

In this case, because the blow-by gas distribution grooves 35 for introducing the blow-by gas into the intake passages 20 is formed in the rear surface of the EGR plate 4 facing the engine, the EGR gas introduction ports 32 can be spaced away from the blow-by gas introduction grooves 14 by using a simple structure. Thereby, the clogging of the EGR gas introduction ports 32 owing to the deposition of oil carried by the blow-by gas can be effectively avoided.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. An exhaust gas recirculating (EGR) device for an internal combustion engine, the EGR device comprising:
    an EGR passage member interposed between a main body of an internal combustion engine and an intake pipe, and defining an intake passage for conducting an engine intake from the intake pipe to an intake port of a cylinder head of the engine, an EGR passage for conducting exhaust gas of the engine into the intake passage and an EGR gas introduction port for introducing the exhaust gas from the EGR passage into the intake passage;
    wherein the EGR gas introduction port includes an inlet end and an outlet end, and has a cross sectional area progressively increasing from the inlet end to the outlet end, the outlet end opening out at an upper part of the intake passage,
    wherein the passage member is additionally formed with blow-by gas passage for conducting blow-by gas of the engine to an intake port of the engine, and an inlet of the blow-by gas passage is provided on a side of the passage member remote from the engine while an outlet of the blow-by passage is provided in a part of the intake passage adjacent to the engine.

2. The exhaust gas recirculating device according to claim 1, wherein the EGR gas introduction port is provided adjacent to an interface between the EGR passage member and the intake pipe.

3. The exhaust gas recirculating device according to claim 2, wherein the EGR gas introduction port has an axial line that passes across a part of an inner passage of the intake pipe.

4. The exhaust gas recirculating device according to claim 2, wherein the EGR gas introduction port comprises a small diameter section formed in an inlet part thereof and a large diameter section formed in an outlet part thereof.

5. The exhaust gas recirculating device according to claim 2, wherein the EGR gas introduction port comprises a tapered configuration having a progressively increasing diameter from an inlet end to an outlet end thereof.

6. An exhaust gas recirculating (EGR) device for an internal combustion engine, the EGR device comprising:
    an EGR passage member interposed between a main body of an internal combustion engine and an intake pipe, and defining an intake passage for conducting an engine intake from the intake pipe to an intake port of a cylinder head of the engine, an EGR passage for conducting exhaust gas of the engine into the intake passage and an EGR as introduction port for introducing the exhaust gas from the EGR passage into the intake passage;
    wherein the EGR as introduction sort includes an inlet end and an outlet end, and has a cross sectional area progressively increasing from the inlet end to the outlet end, the outlet end opening out at an upper part of the intake passage,
    wherein the engine comprises a plurality of cylinders arranged in a row, and the EGR passage member comprises a plurality of intake passages corresponding to the different cylinders of the engine and an EGR chamber interposed between the EGR passage and the inlet ends of the EGR gas introduction ports, wherein the passage member is additionally formed with a bifurcated blow-by gas passage for conducting blow-by gas of the engine, and an inlet of the blow-by gas passage is provided on a side of the passage member remote from the engine while each of bifurcated outlets of the blow-by gas passage is provided in a part of the corresponding intake passage adjacent to the engine.

7. The exhaust gas recirculating device according to claim 1, wherein the engine comprises a plurality of cylinders arranged in a row, and the EGR passage member comprises a plurality of intake passages corresponding to the different cylinders of the engine and an EGR chamber interposed between the EGR passage and the inlet ends of the EGR gas introduction ports.

8. An exhaust gas recirculating (EGR) device for an internal combustion engine, the EGR device comprising:
    an EGR passage member interposed between a main body of an internal combustion engine and an intake pipe, and defining an intake passage for conducting an engine intake from the intake pipe to an intake port of a cylinder head of the engine, an EGR passage for conducting exhaust gas of the engine into the intake passage and an EGR gas introduction port for introducing the exhaust gas from the EGR passage into the intake passage;
    wherein the EGR gas introduction port includes an inlet end and an outlet end, and has a cross sectional area progressively increasing from the inlet end to the outlet end, the outlet end opening out at an upper part of the intake passage,
    wherein the engine comprises a plurality of cylinders arranged in a row, and the EGR passage member corn rises a plurality of intake passages corresponding to the different cylinders of the engine and an EGR chamber interposed between the EGR passage and the inlet ends of the EGR gas introduction ports; and
    an EGR control valve attached to an outer end of the passage member remote from the engine and having an inlet port and an outlet port, and the EGR passage includes a first part extending across the passage member from the engine to the inlet port of the EGR control valve and a second part extending from the outlet port of the control valve to the EGR gas introduction port via an EGR chamber formed in the passage member.

9. The exhaust gas recirculating device according to claim 8, wherein the passage member comprises a first member adjacent to the engine, a second member remote from the engine and a gasket interposed between the first member and second member, the first member is provided with a groove extending in a direction of the cylinder row on a side of the first member remote from the engine and defining an elongated chamber in cooperation with the gasket, one end of the elongated chamber being communicated with the second part of the EGR passage, and the second member is formed with the EGR chamber, an opening being formed in the gasket for communicating the elongated chamber with the EGR chamber.

10. The exhaust gas recirculating device according to claim 9, wherein the first member is integrally formed with a cylinder head of the engine.

11. The exhaust gas recirculating device according to claim 9, wherein the gasket is formed with two openings communicating the elongated chamber with the EGR chamber, and one of the openings adjacent to the one end of the elongated chamber communicating with an upstream part of the second part of the EGR passage is smaller than the other opening.

* * * * *